3,261,686
PHOTOPOLYMERIZABLE COMPOSITIONS AND ELEMENTS

Jack Richard Celeste, Westfield, and Sigrid Bauer, New Brunswick, N.J., assignors to E. I. du Pont de Nemours and Company, Wilmington, Del., a corporation of Delaware
No Drawing. Filed Apr. 23, 1963, Ser. No. 274,909
4 Claims. (Cl. 96—115)

This invention relates to new ethylenically unsaturated monomers and to photopolymerizable compositions containing such monomers.

Photopolymerizable compositions such as those used for printing plates and those used for thermal transfer contain (1) a macromolecular polymer binder, (2) an ethylenically unsaturated monomer and, usually, (3) an addition polymerization initiator. It is well known that an ethylenically unsaturated monomer containing more than one terminal ethylenic group can act as a plasticizer for the binder before exposure as well as a crosslinking agent during exposure to actinic radiation. This plasticizing action has its advantages as well as its disadvantages, for one must balance the amount of monomer needed for optimum speed of addition polymerization against the physical quality (hardness) of the finished product.

To be more specific, compositions for photopolymer printing plates should have a high enough photo speed to make them practical, but at the same time be hard enough to prevent plugging or polymerization of non-relief areas of an exposed photopolymerizable plate.

Compositions for a thermal transfer system, on the other hand, should maintain practical speed of polymerization but should be of such a composition that it will transfer at the required temperature but not transfer at normal or storage temperature. Practical compositions for photothermographic transfer should provide images of adequate contrast, i.e., marked differences in physical properties, e.g., thermal flow, must exist between exposed and underexposed areas, otherwise transfer of unwanted areas (commonly called background stain) occurs.

Polyethylene glycol diacrylate and triethylene glycol diacrylate are disclosed in the photopolymerizable compositions of Notley and Burg et al. Patents Nos. 2,951,758 and 3,060,023. While practical, they leave something to be desired in respect to the foregoing requirements. Because of the high plasticity effects of polyethylene glycol diacrylate and triethylene glycol diacrylate (i.e., monomer/binder ratio needed to produce the required softness), these monomeric esters produce, at the desired concentration for speed, a photopolymerizable printing plate composition that is lacking in hardness.

On the other hand, polyethylene glycol diacrylate and triethylene glycol diacrylate, when used in a composition for thermal transfer, are not entirely satisfactory and produce copies with high background stain. To overcome this, a sensitometric modifier, including those described in assignee's Heiart appln. Ser. No. 186,221 filed April 9, 1962, now Patent No. 3,203,801, and Burg appln. Ser. No. 186,222 now Patent No. 3,203,802 filed April 9, 1962, e.g., N,N-di(beta-hydroxyethyl)-p-nitrosoaniline and N-benzylidene aniline-N-oxide, has been used, which produces the desired high contrast but reduces the speed to below the level necessary for a high quality product.

It is an object of this invention to provide improved photopolymerizable compositions, layers and elements embodying them. A further object is to provide such products with ethylenically unsaturated monomers containing at least two acrylyl groups, which are compatible with macromolecular organic polymer binders. A still further object is to provide such photopolymerizable compositions and elements that have improved non-plugging characteristics and practical speeds at high contrast when used to make printing reliefs and images. Still further objects will be apparent from the following description of the invention.

The photopolymerizable compositions, and the layers and elements embodying the compositions of this invention comprise (a) A thermoplastic macromolecular organic polymer solid at 50° C., and (b) At least one ester of a pentaerythritol compound containing one to two pentaerythritol nuclei of the formula:

$$\begin{array}{c} -OH_2C \\ \phantom{-OH_2C} \diagdown \phantom{C} \diagup CH_2-O- \\ \phantom{-OH_2CC}C \\ \phantom{-OH_2C} \diagup \phantom{C} \diagdown \\ -OH_2C \phantom{CCC} CH_2-O- \end{array}$$

wherein two to three of the free bonds have attached thereto an arcylyl radical and the remaining bonds are linked to an aliphatic hydrocarbon or an ether- or ester-substituted hydrocarbon radical, a hydroxyalkyl radical or a hydrogen atom. The compositions may also contain one, two or all of the following constituents:

(a–a) An organic plasticizer for constituent (a), (c) An addition polymerization initiator activatable by actinic radiation (e.g., of wavelength from 1200 to 7000 m$\mu$) and thermally inactive below 185° C., and, if desired, (d) An addition polymerization inhibitor, and/or (e) A chain transfer agent, including those described in Plambeck et al. U.S.P. 3,046,127.

The foregoing constituents can be present in the respective amounts by weight, as follows:

(a) 10 to 99
(b) 99 to 1
(a–a) 0 to 89
(c) 0.001 to 10
(d) 0.001 to 2
(e) 0.001 to 10

Constituent (b) includes compounds having the following structure:

$$(ROCH_2-)_pC(CH_2-OH)_m(CH_2-OOCH=CH_2)_n$$

wherein
$n$ is one of the numbers 2 and 3;
$m$ is one of the numbers 0, 1 and 2;
$p$ is one of the numbers 0 and 1; and
$m+n+p$ equals the number 4.

R is alkyl of 1–4 carbons, e.g., methyl, ethyl, n-propyl, n-butyl, isopropyl, hydroxyalkyl of 2–4 carbons, e.g., 2-hydroxyethyl, 3-hydroxy-n-propyl, 4-hydroxy-n-butyl; dihydroxyalkyl of 3 to 4 carbons, e.g., 2,3-dihydroxy-7-propyl, and (1) Groups of the formula $-(CH_2CH_2O)_xCH_2CH_2OH$ where $x=1$ to 5; and groups of the formula $$-\left(\begin{array}{c}CH_2-CHO\\ \phantom{CH_2-}|\\ \phantom{CH_2-}CH_3\end{array}\right)_z-CH_2-CH-OH\\ \phantom{-\left(\begin{array}{c}CH_2-CHO\\ CH\end{array}\right)_zCH_2-CH-}|\\ \phantom{-\left(\begin{array}{c}CH_2-CHO\\ CH\end{array}\right)_zCH_2-CH-}CH_3$$

where $z=1$ to 5.

(2) Groups of the formula —$(CH_2CH_2O)_yCH_3$ where $y=1$ to 15;
(3) Groups of the formula

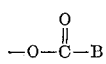

where B=methyl, vinyl, ethyl or n-propyl;
(4) Hydroxyalkyl groups, described above, where part or all of the OH groups are replaced by

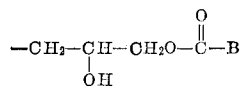

where B=methyl, vinyl, ethyl or n-propyl;
(5) Groups of the formula

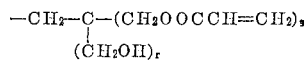

where $s=0$, 1, 2 or 3, and $s+r=3$.

In general, compounds where R is alkyl may be synthesized by diazoalkyl addition to pentaerythritol triacrylate or by reaction of pentaerythritol with standard etherifying reagents and separation of the monoether followed by acrylation. Compounds where R is hydroxyalkyl may be made by the reaction of an appropriate oxirane or cyclic ether with pentaerythritol triacrylate. Compounds having substituent (1) above may be made by reaction of ethylene or propylene oxide with pentaerythritol acrylates. Compounds having substituent (2) above may be made by the chloroether alkyl etherification of pentaerythritol followed by acrylation. The chloroether alkyl compounds are either available commercially or can be made from the alcohol. Compounds having substituent (3) above may be made by the reaction of pentaerythritol acrylates with the proper glycidylcarboxylates. Compounds having substituent (4) above can be made by treating hydroxyalkyl derivatives previously mentioned with the proper acid or acid anhydride. Compounds having substituent described in (5) above may be made by the esterification of dipentaerythitol with acrylic acid.

Particularly useful monomers of these classes are pentaerythritol diacrylate and triacrylate; dipentaerythritol tetraacrylate, pentaacrylate and hexaacrylate; 2,2,2,2'-tetraacrylyoxymethyl - 2' - hydroxydiethyl ether; 2,2,2,1'-tetraacrylyoxymethyl-2'-hydroxydiethyl ether and 2,2,2-triacrlyoxymethyl-2'-hydroxydiethylether.

Photopolymerizable elements of this invention suitable for a thermal transfer process comprise a stratum and a support, said stratum being solid below 40° C., and capable on exposure of providing (1) image areas (underexposed) which are thermally transferable by having a flow, stick or transfer temperature above 40° C. and below 220° C., comprising the constituents (a)–(d) described above.

The thermal transfer process of this invention comprises pressing the surface of said stratum into contact with the image-receptive surface of a separate element, heating at least one of said elements to a temperature of at least 40° C., and separating the two elements whereby the thermally transferable underexposed image areas of said stratum transfer to said image-receptive element.

Suitable apparatus in which the photopolymerizable elements of this invention can be used for photothermographic transfer are disclosed in assignee's U.S. applications of Heiart and Velvel, Ser. No. 234,616 filed Nov. 1, 1962 (U.S.P. 3,211,074, Oct. 12, 1965) and Cohen Ser. No. 250,856, now abandoned, filed Jan. 11, 1963.

Photopolymerizable layers of the elements for photothermographic transfer processes generally are 0.00001 to 0.005 and preferably 0.0001 to 0.001 inch, and those for making printing reliefs are about 0.003 to 0.250 and preferably 0.001 to 0.0040 inch in thickness.

Suitable thermoplastic polymers for use as components (a) include: copolyester, e.g., those prepared from the reaction product of a polymethylene glycol of the formula $HO(CH_2)_nOH$, wherein $n$ is a whole number 2 to 10 inclusive, and (1) hexahydroterephthalic, sebacic and terephthalic acids, (2) terephthalic, isophthalic and sebacic acids, (3) terephthalic and sebacic acids (4) terephthalic and isophthalic acids, and (5) mixtures of copolyesters prepared from said glycols and (i) terephthalic, isophthalic and sebacic acids and (ii) terephthalic, isophthalic, sebacic and adipic acids, (b) nylons or polyamides, e.g., N-methoxymethyl polyhexamethylene adipamide; (c) vinylidene chloride copolymers, e.g., vinylidene chloride/acrylonitrile; vinylidene chloride/methylacrylate and vinylidene chloride/vinylacetate copolymers; (d) ethylene/vinyl acetate copolymer; (3) cellulosic ethers, e.g., methyl cellulose, ethyl cellulose and benzyl cellulose; (f) polyethyene, (g) synthetic rubbers, e.g., butadiene/acryonitrile copolymers, and chloro-2-butadiene-1,3 polymers; (h) cellulose esters, e.g., cellulose acetate, cellulose acetate succiante and cellulose acetate butyrate; (i) polyvinyl esters, e.g., polyvinyl acetate/acrylate, polyvinyl acetate/methacrylate and polyvinyl acetate; (j) polyacrylate and alpha-alkyl polyacrylate esters, e.g., polymethyl methacrylate and polyethyl methacrylate; (k) high molecular weight polyethylene oxides of polyglycols having average molecular weights from about 4,000 to 1,000,000; (l) polyvinyl chloride and copolymers, e.g., polyvinyl chloride/acetate; (m) polyvinyl acetal, e.g., polyvinyl butyral, polyvinyl formal; (n) polyformaldehydes; (o) polyurethanes; (p) polycarbonates; (q) polystyrenes.

In addition to the plasticizer which can be added to the thermoplastic polymer constituent of the photopolymerizable composition there can be added non-thermoplastic polymeric compounds to give certain desirable characteristics, e.g., to improve adhesion the base support, adhesion to the receptor surface on transfer, wear properties, chemical inertness, etc. Suitable non-thermoplastic polymeric compounds include polyvinyl alcohol, cellulose, anhydrous gelatin, phenolic resins and melamine-formaldehyde resins, etc. If desired, the photopolymerizable layers can also contain immiscible polymeric or non-polymeric organic or inorganic fillers or reinforcing agents which are essentially transparent at the wave-lengths used for the exposure of the photopolymeric material, e.g., the organophilic silicas, bentonites, silica, powdered glass, colloidal carbon, as well as various types of dyes and pigments, in amounts varying with the desired properties of the photopolymerizable layer. The fillers are useful in improving the strength of the composition, reducing tack and in addition, as coloring agents.

The addition polymerizable ethylenically unsaturated compounds for use as components (b) are taken from the monomers herein described and may also include mixtures of these monomers and minor amounts of other polymerizable compounds known to the prior art may be added for special purposes. The amount of these monomers added will, of course, vary with the particular thermoplastic polymers used.

A preferred class of addition polymerization initiators (c) activatable by actinic light and thermally inactive at and below 185° C. includes the substituted or unsubstituted polynuclear quinones which are compounds having two intracyclic carbonyl groups attached to intracyclic carbon atoms in conjugated six-membered carbocyclic ring, there being at least one aromatic carbocyclic ring fused to the ring containing the carbonyl groups. Suitable such initiators include 9,10-anthraquinone,
1-chloroanthraquinone,
2-chloroanthraquinone,
2-methylanthraquinone,
2-tert-butylanthraquinone, octametrylanthraquinone,
1,4-naphthoquinone,
9,10-phenanthrenequinone,
1,2-benzanthraquinone,
2,3-benzanthraquinone,
2-methyl-1,4-naphthoquinone,
2,3-dichloronaphthoquinone,
1,4-dimethylanthraquinone,
2,3-dimethylanthraquinone,
2-phenylanthraquinone,
2,3-diphenylanthraquinone,
Sodium salt of anthraquinone alphasulfonic acid,
3-chloro-2-methylanthraquinone,
retenquinone,
7,8,9,10-tetrahydronaphthacenequinone, and
1,2,3,4-tetrahydrobenzene(a)anthracene-7,12 dione.

Other photo-initiators which are also useful are described in Plambeck U.S. Patent 2,760,863 and include vicinal ketaldonyl compounds, such as diacetyl, benzil, etc.; α-ketaldonyl alcohols, such as benzoin, pivalon, etc.; acyloin ethers, e.g., benzoin methyl and ethyl ethers, etc.; α-hydrocarbon substituted aromatic acyloins, including α-methylbenzoin, α-allybenzoin, and α-phenylbenzoin.

Suitable thermal polymerization inhibitors (d) that can be used in addition to the preferred p-methoxyphenol include hydroquinone, and alkyl and aryl-substituted hydroquinones and quinones, tert-butylcatechol, pyrogallol, copper resinate, naphthylamines, beta-naphthol, cuprous chloride, 2,6,-di-tert-butyl p-cresol, phenothiazine, pyridine, nitrobenzene and dinitrobenzene. Other useful inhibitors include p-toluquinone and chloranil.

Various dyes, pigments, thermographic compounds and color-forming components can be added to the photopolymerizable compositions to give varied results after the thermal transfer. These additive materials, however, preferably should not absorb excessive amounts of light at the exposure wave length or inhibit the polymerization reaction.

Among the dyes useful in the invention are Fuchsine (C.I. 42510), Auramine Base (C.I. 4100B), Calcocid Green S (C.I. 44090), Para Magenta (C.I. 42500), Tryparosan (C.I. 42505), New Magenta (C.I. 42520), Acid Violet RRH (C.I. 42425), Red Violet 5RS (C.I. 42690), Nile Blue 2B (C.I. 51185), New Methylene Blue GG (C.I. 51195), C. I. Basic Blue 20 (C.I. 42585), Iodine Green (C.I. 42556), Night Green B (C.I. 42115), C.I. Direct Yellow 9 (C.I. 19540), C.I. Acid Yellow 17 (C.I. 18965), C.I. Acid Yellow 29 (C.I. 18900), Tartrazine (C.I. 19140), Supramine Yellow G (C.I. 19300), Buffalo Black 10B (C.I. 27790), Naphthalene Black 12R (C.I. 20350), Fast Black L (C.I. 51215), Ethyl Violet (C.I. 42600), Pontacyl Wool Blue BL (C.I. 50315), and Pontacyl Wool Blue GL (C.I. 50320) (numbers obtained from the second edition of Color Index).

Suitable pigments, useful thermographic additives and suitable color forming components are listed in Burg and Cohen U.S. Patent 3,060,023.

The photopolymerizable composition is preferably coated on a base support. Suitable support materials are stable at the heating temperatures used in the instant invention. Suitable bases or supports include those disclosed in U.S. Patent 2,760,863, glass, wood, paper, cloth, cellulose esters e.g., cellulose acetate, cellulose propionate, cellulose butyrate, etc., and other plastic compositions such as polyolefins e.g., polypropylene. The support may have in or on its surface and beneath the photopolymerizable stratum an antihalation layer as disclosed in said patent or other substrata needed to facilitate anchorage to the base.

The supports can have an anti-blocking or release coating, e.g., finely divided inert particles in a binder such as silica in gelatin.

The coated elements containing compositions of this invention may be protected against the effects of oxygen inhibition by exposure in a vacuum frame, by a removable cover sheet, as described in assignee's U.S. patent of Heiart, No. 3,060,026 issued Oct. 23, 1962, or by being overcoated with a cover stratum comprising at least one wax as described in assignee's U.S. patent application of Burg (Serial No. 234,214 filed Oct. 30, 1962, U.S.P. 3,203,805, Aug. 31, 1965). The wax overcoating may be applied from an aqueous dispersion as a melt, or from an organic solvent system.

The receptor support to which the image is transferred must also be stable at the process temperatures. The particular support used is dependent on the desired use for the transferred image and on the adhesion of the image to the base. Suitable supports include paper including bond paper, resin and clay sized paper, resin coated or impregnated paper, cardboard, metal sheets, foils and meshes e.g., aluminum, copper, steel, bronze, etc.; wood, glass, nylon, rubber, polyethylene, linear condensation polymers such as the polyesters, e.g., polyethylene terephthalate, regenerated cellulose, cellulose esters, e.g., cellulose acetate, silk, cotton, and viscose rayon fabrics or screens.

The invention is further illustrated by, but is not intended to be limited to the following examples wherein the parts and percentages are by weight.

EXAMPLE I

*Pentaerythritol triacrylate*

A. PREPARATION

Pentaerythritol is esterified with glacial acrylic acid using an acid catalyst and a polymerization inhibitor to prevent polymerization of the acrylic acid or the pentaerythritol triacrylate. The extent of completion of the reaction is judged by the amount of water removed during heating.

$$C(CH_2OH)_4 + 3CH_2=CH-COOH \longrightarrow$$

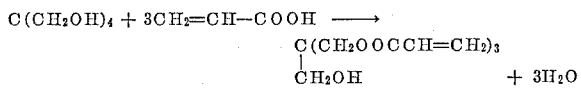

In a 5-l. three-necked flask connected with a stirrer, thermometer and condenser, there were placed 1420 ml. of dried benzene
409 g. (3 moles) of pentaerythritol
3 g. of cuprous oxide
46 g. of conc. sulfuric acid
1296 g. (18 moles) of glacial acrylic acid with 1% p-methoxyphenol During a 12 hour heating period, the temperature rose to 88° C. and 162 ml. of water was separated from the water-benzene distillate. After cooling, the mixture was washed with 700 ml. or 20% NaCl solution, twice with 350 ml. of 24% KHCO₃ solution and finally with 350 ml. of 20% NaCl-solution. Then the benzene solution was filtered, 0.8 g. of p-methoxyphenol added as thermal inhibitor and the remaining solvent was removed in vacuum using copper wire as an inhibitor during this operation.

Yield: 909 g. (86% of theory).

Analysis showed 1.64% volatiles and an equivalent weight of 99.2; calc'd 99.3 based upon bromination.

B. COATING COMPOSITION

A coating solution was prepared from 2.8 g. of the above pentaerythritol triacrylate monomer; 0.75 g. of cellulose acetate butyrate containing ca. 21% acetyl groups, 26% butyl groups and having a viscosity of 9–13.5 poises as determined by ASTM method D–1343–54T in solution described as Formula A, ASTM method D–871–54T; 0.60 g. of cellulose acetate having a combined acetic number of ca. 55 and a viscosity of 147–197 poises as determined by ASTM methods D–1343–56 in the solution described as Formula A, ASTM method D–871–56; 0.04 g. of phenanthrenequinone; 0.10 g. of polyethylene glycol of average molecular weight 4000 in 0.8 g. of methanol; 0.01 g. of Crystal Violet (C.I. 42555) and 14.7 g. of acetone.

The solution was coated on .001 inch polyethylene terephthalate film base using a doctor knife with a clearance of .006 inch and, after drying for 15 minutes, was pressure laminated to another .001 inch strip of polyethylene terephthalate film base.

C. EXPOSURES AND TRANSFER PROCEDURE

One-second exposures were made through a 6 x 6 transmission wedge which varied in density by 0.1 of a density unit per step along one ($x$) and where each density step extended the length of the other ($y$) axis. The light source consisted of a 140-ampere, 5000-watt carbon-arc set a distance of 16 inches from the matrix sample.

After exposure, the pressure laminated film base is removed and the matrix is placed in intimate contact with a receptor sheet and placed on a 6 x 6 platen which has a heat differential along its $y$ axis varying continuously from 50 to 150° C. A roller then passes over the matrix and receptor sheet at a speed of 20 in./min. pressing them against the platen with a pressure of 25 lb./in.² The sheets are separated and the speed and contrast of the matrix sample are calculated from the densities, of the stepwise exposure, made at the optimum transfer temperature on the receptor sheet.

(D)

Calculations using the densities at the optimum transfer temperature showed that the composition produced images of high contrast.

EXAMPLE II

*Dipentaerythritol acrylate*

A. PREPARATION

The principle is the same as for pentaerythritol triacrylate. The extent of completion of the reaction is judged by the amount of water removed.

$$(CH_2OH)_3-C-CH_2OCH_2-C-(CH_2OH)_3 + (3 + X)-CH_2=CH-COOH \longrightarrow$$
$$(CH_2=CH-COO-CH_2)_3-C-CH_2OCH_2-C(CH_2OO-CH=CH_2)_x$$
$$(CH_2OH)_y + (3 + X)-H_2O$$

where $x+y=3$.

In a 3-l., three-necked flask connected with a stirrer, thermometer, and condenser there were placed 600 ml. of dried benzene
191 g. of dipentaerythritol, tech. grade
1.35 g. of cuprous oxide
18 g. of conc. sulfuric acid
5.0 g. of glacial acrylic acid with .1% p-methoxyphenol.

During a 10-hour heating period, the temperature rose 88° C. and 78 mls. of water was separated from the water-benzene distillate. After cooling, the mixture was washed twice with 500 ml. of 20% NaCl solution, three times with 500 ml. of 24% KHCO₃-solution, and finally with 500 ml. or 20% NaCl-solution. Then the benzene solution was filtered and the solvent was removed in vacuo using copper wire as inhibitor during this operation.

Yield: 375 g.

Analysis showed 5.3% volatiles and an equivalent weight of 101; calc'd 96 based on bromination.

(This represents 50% of pentaacrylate and 50% of tetraacrylate.)

B. COATING COMPOSITION

The coating solution was prepared from 2.8 g. of the above mixture of acrylates; 0.75 g. of cellulose acetate butyrate containing ca. 21% acetyl groups, 26% butyl groups and having a viscosity of 9–13.5 poises as determined by ASTM method D–1343–54T in solution described as Formula A, ASTM method D–871–54T; 0.60 g. of cellulose acetate having a combined acetic number of ca. 55 and a viscosity of 147–197 poises as determined by ASTM method D–1343–56 in the solution described as Formula A, ASTM method D–871–56; 0.04 g. of phenanthrenequinone; 0.1 g. of polyethylene glycol of average molecular weight 4000 in 0.8 g. of methanol; 0.01 g. of Crystal Violet and 14.7 g. of acetone. (It was coated as described under Example I, part B and exposed and transferred as described under Example I, part C.)

(C)

Calculations using the densities at the optimum transfer temperature showed that the composition produced images of high contrast.

EXAMPLE III

*2,2,2,2'-tetraacrylyloxymethyl - 2' - hydroxydiethyl ether; and/or 2,2,2,1' - tetraacrylyloxymethyl - 2'-hydroxydiethylether*

A. PREPARATION

In a 1-l., three-necked round bottom flask carrying a stirrer, thermometer, condenser and dropping funnel were placed 250 cc. sodium-dried benzene, 115 g., 0.39 mole, pentaerythritol triacrylate, 0.5 cc. conc'd sulfuric acid, 0.05 g. of p-methoxyphenol and 0.10 g. cuprous oxide. Glycidyl acrylate, 51 g., 0.04 mole, was added dropwise over an eight minute period to the stirred mixture. When the addition was completed the mixture was stirred for twenty minutes and then heated on a steam bath for two hours during which time the temperature rose to 84° C. and a small amount of gel-like polymer formed on the sides of the flask. After cooling and filtering first through nainsook and then filter paper to remove about 15 g. of polymer, the benzene filtrate was washed twice with 50 ml. of 20% sodium chloride four times with saturated sodium bicarbonate and twice with 50 ml. of 20% sodium chloride. The resulting neutral benzene extract was air evaporated to yield 87 g. of an oily liquid analyzing for 2% volatiles and an equivalent weight of 108; calc'd 106.5, based in bromination.

B. COATING COMPOSITIONS

Coating compositions were prepared as in Example I part B using 2.8 g. of the above monomer and a second using 2.8 g. of pentaerythritol triacrylate as a control.

(C)

Exposures and transfers of the two coated samples were made as described in Example I, part C.

(D)

Calculations using the densities at the optimum transfer temperature for each coating showed the above monomer to be twice as fast as pentaerythritol triacrylate at equal constrast.

EXAMPLE VI

*Comparison of pentaerythritol triacrylate with pentaerythritol trimethacrylate*

A. COATING COMPOSITION

A coating solution was prepared from 4.0 g. of pentaerythritol triacrylate; .8 g. of cellulose acetate butyrate containing 26% butyl groups, ca. 21% acetyl groups and having a viscosity of 56–131 poises as determined by ASTM method D–1343–54T in solution described as Formula A, ATSM method D–871–54T; 0.55 g. of cellulose acetate having a combined acetic number of ca. 55 and a viscosity of 147–197 poises as determined by ATSM method D–1343–56 in the solution described as Formula A, ASTM method D–871–56; 0.04 g. of phenanthrenequinone; 0.20 g. of methoxypolyethylene glycol hydrogen succinate (made from a mixture of methoxypolyethylene glycols having an average molecular weight of about 300), in 8 g. of methanol; .06 g. of Pontacyl Wool Blue BL (C.I 50315) in 2.4 g. of methanol and 11.15 g. of acetone.

A second solution was prepared in exactly the same way except that 4.0 g. of pentaerythritol trimetharcylate were used instead of pentaerythritol triacrylate.

Each solution was coated on .001 inch polyethylene terephthalate film base using a doctor knife with a clearance of .006 inch and, after drying for 20 minutes, each was pressure laminated to another .001 inch strip of polyethylene terephthalate film base.

B. EXPOSURES AND TRANSFER PROCESS

Exposures of the above coatings were made in the manner described in Example I part C except that a step wedge having a variable density of 0.05 density unit per step was used.

The transfer process was the same as that described in Example I part C.

(C)

Calculations using the densities at the optimum transfer temperature for each coating showed that pentaerythritol triacrylate is 4 times faster than pentaerythritol trimethacrylate.

EXAMPLE V

*2,2,2-triacrylyloxymethyl-2'-hydroxydiethylether*

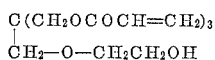

A. PREPARATION

For 16 hours, ethylene oxide was passed through 0.25 mole of pentaerythritol triacrylate at 50–60° C. The resulting liquid was washed with water, dried, and then analyzed and found to have an equivalent weight of 114.4 based on bromination (theory 114.0).

B. COATING COMPOSITION

A coating composition was prepared in the manner described in Example IV part A except that 4 g. of 2,2,2-triacrylyloxymethyl - 2' - hydroxydiethylether monomer was used.

C. EXPOSURE AND TRANSFER PROCESS

Exposures of the above coatings were made in the manner described in Example I part C except that a step wedge having a variable density of 0.05 density unit per step was used.

The transfer process was the same as that described in Example I part C.

(D)

Calculations using the densities at the optimum transfer temperature showed that the composition was equal to the pentaerythritol triacrylate composition in speed and contrast.

EXAMPLE VI

*Comparison of pentaerythritol triacrylate with pentaerythritol tetramethacrylate*

A. COATING COMPOSITION

A solution was prepared from 2.0 g. of pentaerytritol triacrylate; .8 g. of cellulose acetate butyrate containing 26% butyl groups, ca. 21% acetyl groups and having a viscosity of 56–131 poises as determined by ASTM method D–1343–54T in solution described as Formula A, ASTM method D–871–54T; .55 g. of cellulose acetate having a combined acetic number of ca. 55 and a viscosity of 147–197 poises as determined by ASTM method D–1343–56 in the solution described as Formula A, ASTM method D–871–56; 2.0 g. of dibutyl phthalate; 0.04 g. of phenanthrenequinone; 0.20 g. of the methoxypolyethylene glycol hydrogen succinate described in Example IV, in 0.8 g. of methanol; .06 g. of Pontacyl Wool Blue BL (C.I. 50315) in 2.4 g. of methanol and 11.15 g. of acetone.

A second solution was prepared in exactly the same way except that 2.0 g. of pentaerythritol tetramethacrylate was used instead of pentaerythritol triacrylate.

Each solution was coated on .001 inch polyethylene terephthalate film base using a doctor knife with a clearance of .006 inch and after drying 20 minutes each was pressure laminated to another .001 inch strip of polyethylene terephthalate film base.

B. EXPOSURES AND TRANSFER PROCESS

Exposures of the above coating were made in the manner described in Example I part C except that a step wedge having a variable density of 0.05 density unit per step was used.

The transfer process was the same as that described in Example I part C.

(C)

Calculations using the densities at the optimum transfer temperature for each composition showed that the composition containing pentaerythritol triacrylate was 16 times faster than the composition containing pentaerythritol tetramethacrylate.

In the preceding examples, methoxy polyethylene glycol (of average molecular weight 750) hydrogen succinate can be made by the reaction of methoxy polyethylene glycol of average molecular weight 750 with succinic anhydride for 100 minutes at 140° C.

EXAMPLE VII

*Comparison of pentaerythritol triacrylate with pentaerythritol trimethylacrylate using a different initiator*

A. COATING COMPOSITION

A coating composition of pentaerythritol triacrylate and trimethacrylate were prepared as shown in Example IV part A except that the .04 g. of phenanthrenequinone were replaced with .04 g. of benzoin methyl ether.

B. EXPOSURES AND TRANSFER PROCESS

Exposures of the above coatings were made the same as described in Example I part C except that a step wedge having a variable density of .05 density unit per step was used.

The transfer process was the same as described in Example I part C.

(C)

Calculations using the densities at the optimum transfer temperature for each coating showed that pentaerythritol triacrylate is 1.7 times faster than pentaerythritol trimethacrylate.

This example demonstrates that pentaerythritol triacrylate is capable of providing compositions of higher speed in several initiating systems.

EXAMPLE VIII

A photopolymerizable composition was prepared by milling on a rubber mill at 150° C. for 25 minutes 97.5 g. of cellulose acetate hydrogen succinate; 120 g. of water, 4.5 g. of glutaric acid; 26.8 g. pentaerythritol triacrylate (containing 0.105 g. of p-methoxyphenol and 0.105 g. of 2-ethyl anthraquinone); and 26.8 g. polyethylene glycol diacrylate (made from a mixture of polyethylene glycols having an average molecular weight of about 300), containing 0.105 g. p-methoxyphenol, 0.105 g. 2-ethyl anthraquinone and 0.7 ml. of triethylamine. A control was similarly made replacing the 26.8 g. pentaerythritol triacrylate with 26.8 g. of the just-described polyethylene glycol diacrylate. These compositions were formed into sheets .040 inch thick by pressing at 140° C. in a hydraulic press. The sheets were then laminated to steel sheet supports, .012 inch thick, by the method described in Example III of Assignee's Burg application, Ser. No. 750,868 filed July 25, 1958, U.S.P. 3,036,913, May 29, 1962.

The said photopolymerizable elements were conditioned for 48 hours at 20% RH and 77° F. After this period, the surface hardness was measured under these conditions (77° F., 20% RH) using a Knoop Hardness tester. The photopolymerizable element containing the pentaerythritol triacrylate was found to be harder, 2.7 Knoop hardness number compared to 0.8 Knoop hardness number for the element without the pentaerythritol triacrylate.

The Knoop hardness number was determined by ASTM method D-1474-57T part 8, 1961, pages 973-975 using a Tukon Microhardness tester manufactured by the Wilson Mechanical Instrument Division of the American Chain and Cable Company. As previously mentioned, a harder photopolymerizable element has the advantage of being less susceptible to surface defects caused by imbedding the line process negative into the photopolymerizable element during exposure to actinic radiation. Imbedding the negative in the photopolymer surface causes surface plugging. These photopolymerizable elements were conditioned in a carbon dioxide atmosphere for 24 hours to exclude dissolved oxygen and attain maximum photo sensitivity. The elements, after the 24 hour conditioning period, were placed 30" away from an 140 amp. carbon arc lamp and exposed through a halftone and line process negative for 3 minutes. The unexposed polymer was removed by spray washing for 10 minutes using 0.04 N aqueous solution of sodium hydroxide. Examination of the relief plate revealed no tendency for surface plugging in the element containing pentaerythritol triacrylate, and slight plugging in the element that contained no pentaerythritol triacrylate.

EXAMPLE IX

*A contrast comparison of pentaerythritol triacrylate vs. polyethylene glycol diacrylate*

A. Coating compositions of pentaerythritol triacrylate were made in a manner analogous to Example I, part B in which the percent monomer varied as follows: 57.2%, 61.6%, 65.2% and 69.9% by weight of total composition.

In a similar manner, coating compositions of polyethylene glycol diacrylate were made which varied over the same range of percentages and similar results were obtained.

The above solutions were coated on .001 mil thick polyethylene terephthalate film base using a doctor knife with a clearance of .006 inch and after drying for 15 minutes were pressure laminated to another strip of .001 inch polyethylene terephthalate film base.

B. Exposures of the above coatings were made in the same manner as described in Example I, part C except that a step wedge having a variable density of .05 density units per step was used.

The transfer process was the same as described in Example I, part C.

Below is a table giving the pertinent sensitometric data obtained from the densities at the optimum transfer temperature on the receptor sheets obtained from part B above.

In the foregoing chart:

(1) The optimum transfer temperature is chosen as minimum temperature at which complete transfer occurs in underexposed areas.

(2) The density of each exposure step at this temperature is read and plotted on graph paper vs. log of exposure. $D_{max}$ is the density obtained on this plot of density vs. log exposure where the slope of the curve in the underexposed region is $-1$ (density at the shoulder of the curve). This density should be as high as possible.

(3) $D_{min}$ is the density obtained where the slope of the curve is $-1$ in the overexposed region (density at toe of the curve). This density should be as low as possible.

(4) The log exposure difference between the exposure at $D_{max}$ and the exposure at $D_{min}$ is called copiability. In the most useful compositions the number is as small as possible since it represents the minimum exposure difference which the process can use to render high density message on low density background.

The contrast is calculated as follows:

$$\text{Contrast} = \frac{D_{max} - D_{min}}{\text{Copiability}} = \frac{\text{Change in density}}{\text{Change in log exposure}}$$

As in high contrast silver photographic processes, contrast should be as high as possible.

The "monomer bleed-through" referred to in Chart I is a visual evaluation of the receptor sheet and is a qualitative measure of the amount of monomer that diffuses from the front of the receptor sheet to the back.

The compositions of this invention can be exposed and polymerized without the use of an initiator but longer exposure times are required. For instance, if in Example I a mercury-arc lamp were used to expose the coatings, an exposure 11.5 times longer would be required for the composition without an initiator as compared to a composition containing an initiator.

A practical compoistion for thermal transfer should have a transfer temperature somewhere between 80 and 130° C. Temperatures below 80° C. are less practical for handling since they are tacky and subject to bruising at room temperature. Temperatures above 130° C. are less practical because they are too difficult to obtain with simple equipment. It is understood, therefore, that the composition in Chart I with transfer temperatures of 142° C., 75° C., and 61° C. are less useful. In the chart, it will be noted that, in any one monomer group as the percent monomer increases, so does the contrast, while the transfer temperature decreases. The concentrations given, therefore, cover the useful ranges of these monomers. From the data, it is easily seen that pentaerythritol triacrylate is superior with respect to contrast, copiability, and "monomer bleed-through."

"Monomer bleed-through," besides producing a copy of poor esthetic value, does not allow one to copy on the reverse side of the receptor sheet and further it reduces the maximum density possible on any one side.

CHART I

| Percent Monomer | 57.2 | | 61.6 | | 65.2 | | 69.9 | |
|---|---|---|---|---|---|---|---|---|
| Monomer | PETA [1] | PDA [2] | PETA | PDA | PETA | PDA | PETA | PDA |
| Transfer Temp. (1), °C | 142 | 114 | 114 | 95 | 105 | 75 | 98 | 61 |
| $D_{max}$ (2) | .70 | .68 | .63 | .66 | .75 | .67 | .74 | .68 |
| $D_{min}$ (3) | .06 | .08 | .06 | .04 | .05 | .05 | .03 | .07 |
| Copiability (4) | .12 | .18 | .11 | .16 | .09 | .13 | .08 | .10 |
| Contrast | 5.9 | 3.3 | 5.2 | 3.9 | 7.7 | 4.8 | 8.9 | 6.1 |
| Monomer Bleed Through | None | Moderate | None | Severe | None | Severe | None | Severe |

[1] PETA = Pentaerythritol triacrylate.
[2] PDA = Polyethylene glycol diacrylate.

In particular where the compositions are adjusted to give the same transfer temperature at a most useful temperature range, i.e. 95–98° C.

|  | PDA | PETA |
|---|---|---|
| Temp., ° C | 95 | 98 |
| $D_{max}$ | .66 | .74 |
| $D_{min}$ | .04 | .03 |
| Copiability | .16 | .08 |
| Contrast | 3.9 | 8.9 |

Clearly, PETA's performance is superior in all respects.

As has been shown the compounds of the class herein described possess the needed qualities to give improved photopolymer compositions. In photopolymer compositions for thermal transfer they impart high contrast at satisfactory speeds necessary for such a product along with neater copies which have no "bleed-through." Further they do not need a sensitometric modifier to obtain such contrast as do polyethylene glycol diacrylate and triethylene glycol diacrylate.

The utility of the new compounds is further exemplified in photopolymer printing plate compositions where they produce harder printing plates, thus improving the plugging characteristics previously described. A further advantage is that photopolymerizable layers and elements having high contrast and good speed can be obtained without sensitometric modifiers.

We claim:
1. A photopolymerizable layer comprising:
    (a) a thermoplastic macromolecular organic polymer solid at 50° C., and
    (a–a) at least one ester of a pentaerythritol compound containing a nuclei of the formula:

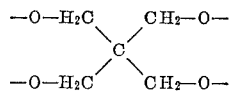

wherein three of the free bonds have attached thereto an acrylyl radical and the remaining free bond is linked to a member selected from the group consisting of an aliphatic hydrocarbon radical, an ether substituted aliphatic hydrocarbon radical, a carboxylic acid ester substituted hydrocarbon radical, a hydroxyalkyl radical and hydrogen.
2. A layer according to claim 1 wherein the ester is pentaerythritol triacrylate.
3. A layer according to claim 1 which contains also
    (c) an addition polymerization initiator activatable by actinic radiation and thermally inactive below 185° C.
4. A layer according to claim 1 containing a polyethylene glycol having a molecular weight of 4,000 to 1,000,000.

References Cited by the Examiner
UNITED STATES PATENTS

| 2,964,401 | 12/1960 | Plambeck | 96—115 X |
| 3,149,975 | 9/1964 | Notley | 96—115 |
| 3,186,844 | 6/1965 | Alles et al. | 96—115 X |

NORMAN G. TORCHIN, *Primary Examiner.*

ALEXANDER D. RICCI, *Examiner.*

R. H. SMITH, *Assistant Examiner.*